United States Patent [19]

Okuyama et al.

[11] Patent Number: 5,525,276
[45] Date of Patent: Jun. 11, 1996

[54] METHOD FOR MANUFACTURING HIGH STRENGTH ISOTROPIC GRAPHITE PISTON COMPONENTS

[75] Inventors: Seiichi Okuyama, Yatusiro; Katutoshi Mizumoto; Sakae Ikegami, both of Kumamoto, all of Japan

[73] Assignee: Tokai Carbon Company Ltd., Tokyo, Japan

[21] Appl. No.: 319,959

[22] Filed: Oct. 7, 1994

[30] Foreign Application Priority Data

Oct. 22, 1993 [JP] Japan .................. 5-287699

[51] Int. Cl.⁶ .................................. C01B 31/04
[52] U.S. Cl. .................. 264/29.300; 264/29.6; 264/122; 264/349; 423/448
[58] Field of Search .................. 423/448; 264/29.1, 264/29.5, 29.7, 122, 125, 29.6, 349, 29.3; 208/435

[56] References Cited

U.S. PATENT DOCUMENTS

| | | | |
|---|---|---|---|
| 3,969,124 | 7/1976 | Stewart | 423/448 |
| 4,764,318 | 8/1988 | Morgenstern et al. | 264/29.5 |
| 4,876,077 | 10/1989 | Murakami | 423/448 |
| 5,069,683 | 12/1991 | Fong et al. | |

FOREIGN PATENT DOCUMENTS

| | | | |
|---|---|---|---|
| 53-142394 | 12/1978 | Japan | 423/448 |
| 61-72610 | 4/1986 | Japan | 423/448 |
| 61-191509 | 8/1986 | Japan | 423/448 |
| 61-295216 | 12/1986 | Japan | 423/448 |

*Primary Examiner*—Mathieu D. Vargot
*Attorney, Agent, or Firm*—Flynn, Thiel, Boutell & Tanis

[57] ABSTRACT

A method for manufacturing a high strength isotropic graphite including a kneading step to mix an aggregate consisting of carbonaceous fine powder with a pitch binder a molding step to mold the raw material prepared by re-pulverizing the kneaded mixture using rubber press method and a carbonizing and graphitizing step to fire carbonize and graphitize the molded product. The aggregate uses a fine mosaic coke powder as the aggregate, which mosaic coke powder is finely pulverized in a jet mill to an average particle size of 1 μm or less and a maximum particle size of 5 μm or less, and has a surface average electrostatic field intensity of $1.2 \times 10^4$ esu/cm² or more. The invention provides a high strength isotropic graphite having a high bending strength of 120 MPa or more, which is suitable for piston components of gasoline engines and provides a method for manufacturing high strength isotropic graphite.

3 Claims, No Drawings

METHOD FOR MANUFACTURING HIGH STRENGTH ISOTROPIC GRAPHITE PISTON COMPONENTS

FIELD OF THE INVENTION

This invention relates to a method for manufacturing a high strength isotropic graphite and specifically to a method for manufacturing a high strength isotropic graphite suitable for industrial production of a graphite having a high material strength applicable to gasoline engine piston components, and relates to a piston component made of graphite for gasoline engines.

BACKGROUND OF THE INVENTION

Isotropic high density graphites have been widely used in applications such as electrodes for electric discharge machining, hot press dies, crucibles for aluminum vapor deposition and semiconductor production and various types of heat- and corrosion-resistant tools. The light weight and self-lubricating properties of isotropic high density graphite are the focus of considerable research, and the research and development of this material as a piston component for gasoline engines is being energetically pursued.

The most commonly used materials in manufacturing a piston component for gasoline engine are aluminum alloy. Graphite is a promising substitute for aluminum alloys because it provides practical advantages such as reduction of piston weight, reduction of friction loss owing to the self-lubrication property inherent in graphite, and reduction of gasoline and oil consumption. It also provides environmental improvements such as the reduction of engine noise. Furthermore, the application of graphite to piston components has been proven to reduce both hydrocarbon (HC) content and nitrogen oxide (NOx) content of engine exhaust gas. This particular characteristic of cleaner exhaust gas comes from the effect of better piston shape, which can be realized as a direct result of graphite's lower thermal expansion coefficient compared to those of aluminum alloys.

An aluminum alloy piston usually has a dead space between the piston head and the piston cylinder wall to absorb the thermal expansion effect. A graphite piston, however, owing to its lower thermal expansion coefficient, allows a straight cylinder wall face. Therefore, uneven combustion in the dead space is eliminated with a graphite piston, and efficient combustion is realized. The resulting exhaust gas contains less HC and less NOx.

Although graphite has many advantages as a piston component as described above, it has the disadvantage of insufficient mechanical strength in practical use. A piston component is exposed to repeated jarring impacts caused by explosive combustion. Ordinary graphite does not have enough strength to survive normal conditions of use. For piston components for vehicle gasoline engines, an ultra-high strength graphite is required with a bending strength of at least 120 MPa.

European Patent No. 0258330B1 disclosed a piston comprising a graphite having a minimum bending strength of 75 MPa and covered with a protective layer of silicon carbide or the like and a piston comprising carbon mixed with a ceramic, metallic, or carbon fiber. However, they do not achieve the strength required.

The usual industrial manufacturing process for isotropic graphite comprises a kneading step to mix an aggregate consisting of petroleum or coal coke powder with a pitch binder, a molding step to mold isotropically the raw material powder previously prepared by re-pulverizing the kneaded product of the preceding step using the rubber press [cold isostatic press (CIP)] method, and a carbonization and graphitization step where the molded product is fired to carbonize and graphitize it. In this process, to increase the material density and strength, the addition of the binder pitch component is increased and the degree of contraction of the material during carbonization is increased to enhance the densification of the structure. Increased pitch addition, however, is accompanied by the generation of a large quantity of volatile matter during carbonization, with the disadvantage that defective phenomena tend to occur such as cracks and voids in the material structure. To eliminate this type of problem, several countermeasures have been proposed such as adjusting the pitch composition applied and adjusting the quantity of volatile matter generated after kneading. Other means disclosed in Japanese Unexamined Patent Publication No. 1990-69308 and Japanese Examined Patent Publication No. 1991-69845 propose that raw coke having specified characteristics obtained from a specific manufacturing process be used to produce isotropic carbon material without adding binder.

Regarding the densification of graphite structure, it is reported that the most effective close packing method is to control the particle size distribution in the raw material aggregate coke powder. Nevertheless, this method risks causing fracture of the graphite which results from increased stress intensity appearing particularly around coarse particles. This stress intensification comes from the non-uniform packing structure which consists of a packing of coarse particles, with fine particles filling the interstices. Consequently, an effective means of obtaining an isotropic graphite with a high strength is to use a coke powder which has a uniform fine particle size and wettability with a relatively small amount of pitch binder. However, this type of coke powder has not yet been introduced, and up to now this has created a barrier to manufacturing a high strength, isotropic densified graphite.

SUMMARY OF THE INVENTION

To solve the above-described problems occurring in the manufacturing of high strength isotropic graphite, the inventors conducted an extensive study of the characteristics of coke aggregate components, aiming to obtain a coke powder with a small particle size and sufficient wettability to pitch binder. The inventors confirmed that one kind of fine mosaic coke particles with specific properties show particularly good interaction (wettability) with pitch binder and that the coke powder obtained by finely pulverizing fine mosaic coke particles in a jet mill as the aggregate reduces the amount of pitch necessary for covering uniformly the aggregate, and that the bonding force at the interface between coke and pitch is high strength isotropic graphite with a bending strength as high as 120 MPa or more, a strength permitting application to piston components. This invention was derived from the above-described findings.

Accordingly, one object of this invention is to provide a method for manufacturing a high strength isotropic graphite having a bending strength of 120 MPa or more.

Another object of this invention is to provide a method for manufacturing a high strength isotropic graphite having a material strength performance suitable for piston components for gasoline engines, and to provide piston components made of graphite for gasoline engines.

Yet another object of this invention is to provide a method for manufacturing industrially a high strength isotropic graphite by applying the processing steps of kneading, molding, carbonizing and graphitizing similar to the conventional process.

The method for manufacturing a high strength isotropic graphite in this invention is similar to the process for manufacturing an isotropic graphite, which includes a kneading step to mix an aggregate consisting of carbonaceous fine powder with a pitch binder, a molding step to mold the raw material prepared by re-pulverizing the kneaded mixture using the rubber press method, a carbonizing and graphitizing step to fire and carbonize the molded product and graphitize it, wherein the aggregate selectively uses a fine mosaic coke powder as the aggregate, which mosaic coke powder is finely pulverized in a jet mill to an average particle size of 1 μm or less and a maximum particle size of 5 μm or less, and has a surface average electrostatic field intensity of $1.2 \times 10^4$ esu/cm$^2$ or more.

The piston component for gasoline engines of this invention is characterized by comprising a high strength isotropic graphite yielded from the process steps of kneading a carbonaceous fine particle aggregate with a pitch binder, pulverizing the mixture, molding the pulverized material, firing to carbonize and graphitize to yield the product, and by that, the product graphite has a bending strength of 120 MPa or more.

The fine mosaic coke particles selectively used in the invention improve the bonding force at the interface between coke and pitch during carbonization through the action of strongly reinforcing the surface of the coke particles with pitch blender, and wetting the coke powder surface with the pitch binder sufficiently while uniformly in a relatively small amount, so that the degree of contraction of the coke during the firing for carbonization becomes equal to that of the pitch. Consequently, no cracks or defects occur on the fired and carbonized material. Since the aggregate consisting of fine mosaic coke particles is finely pulverized, the particle size is uniform, and the specific surface area which binds to pitch becomes large, and high density packing during molding becomes possible, and the obtained graphite has the characteristics of high density and high strength.

DETAILED DESCRIPTION OF THE INVENTION

The first major structure of this invention is the selective use of a fine mosaic coke having an average surface electrostatic field intensity of $1.2 \times 10^4$ esu/cm$^2$ or more as the aggregate. The fine mosaic coke particles are a coke having a characteristic crystal structure of crystallite consisting of laminated parallel carbon network planes having many prism faces represented by (100) and (110) planes against a base plane represented by the (001) plane. These prism faces are extremely reactive, and react with nearby oxygen and water to form oxygen-containing functional groups such as phenolic hydroxyl groups and carboxylic groups, which in turn function to improve the interaction with the pitch binder.

The term "surface electrostatic field intensity" refers to the electrostatic field intensity per specific surface area of nitrogen adsorption against an organic solvent on the coke surface, which electrostatic field intensity is calculated from the slope of a curve drawn by plotting the difference of wet enthalpy and liquid enthalpy against the dipole moment. The wet enthalpy of coke was determined in a twin conductive micro-calorimeter using two types of organic solvent, n-heptane and 1-nitropropane, which have different dipole moments, while having the same occupying area per molecule. Details of surface electrostatic field intensity are described in A. C. Zettlemoyer, J. J. Chessick. Adv. Cat., 11, 263(1959). In this invention, it is important to use a coke with an average value of surface electrostatic field intensity of $1.2 \times 10^4$ esu/cm$^2$ or more. A coke having a lower average surface electrostatic field intensity has insufficient wettability to the pitch binder, which is unable to uniformly cover the coke surface with a smaller amount of pitch and to form a dense structure having no material defects through maintaining an adequate contraction during the firing and carbonizing step.

The second major structure of this invention is that the fine mosaic coke particles are finely pulverized in a jet mill to particles having an average particle size of 1 μm or less and a maximum particle size of 5 μm or less for use as the aggregate coke powder. The reason why a jet mill is used as the means of powdering is that a jet mill using a jet stream performs efficient dry powdering while giving a sharp particle size distribution showing an average particle size of 1 μm or less, and is extremely effective as an industrial process. On the other hand, the conventional wet pulverizing method is inefficient and takes a long time for processing. The fine mosaic coke powder adjusted to give an average particle size of 1 μm or less and a maximum particle size of 5 μm or less has a large specific surface area, aiding bonding with pitch binder, and is capable of high density packing during the molding step, so the powder functions effectively to form a graphite structure with high density and high strength. When the pulverized particles give an average particle size of above 1 μm and a maximum particle size of above 5 μm, the production of a high strength isotropic graphite having a bending strength of 120 MPa or more is impossible even if the used fine mosaic coke has a surface average electrostatic field intensity of $1.2 \times 10^4$ esu/cm$^2$ or more.

The most suitable pitch binder to mix with the aggregate composition of coke powder described above is one containing a large amount of β-resin which contributes to increased bonding and having a good wettability with coke, (containing large amount of toluene-soluble matter and having polar groups). The preferred pitch binder is a coal pitch or a petroleum pitch having a balanced composition, for example, of 17 to 22 wt. % β-resin and 67 to 72 wt. % toluene-soluble matter. The preferable mixing ratio of the pitch binder is in a range of from 100 to 120 wt. parts to 100 wt. parts of aggregate. A pitch binder mixing ratio of below 100 wt. parts gives insufficient bonding force, and one above 120 wt. parts causes cracks and fractures in the material after firing.

The kneading step is conducted using a kneader where both the aggregate composition and the pitch binder are uniformly dispersed and mixed. To uniformly coat the coke powder surface with the binder component during the step, the mixing is preferably performed under pressure while heating the materials to between 150° and 250° C. After completing the kneading operation, the kneader is kept at a slightly reduced pressure to remove low molecular weight components which do not contribute to the bonding from the pitch binder and to adjust the composition of volatile matter.

In the molding step, the mixed materials are re-pulverized to adjust the raw material powder to an average particle size of 3 to 5 μm. The raw material powder is placed in a rubber casing and molded in a rubber press unit under an approximate isostatic pressure of 1000 kg/cm². Then the mold is fired to carbonize it by a conventional process in a heating furnace in a non-oxidizing atmosphere up to 1000° C., and the carbonized mold is transferred to a graphitization furnace for graphitization at an elevated temperature of 2500° C. or above to perform carbonization and graphitization to obtain isotropic high density graphite.

The fine mosaic coke particles which are selectively used in the invention have a crystallite carbon network showing a crystal structure containing a relatively large proportion of prism planes (100) and (110) which contain more oxygen-containing functional groups than the (001) plane. Consequently, the oxygen-containing functional groups have the function of strongly binding the pitch to the surface of the fine coke powder. The carbonization of the pitch in the adsorbed state enhances polycondensation under the action of the oxygen functional groups as the radical reaction initiator, and improves the yield of carbonization, significantly increasing the bonding force at the interface of coke and pitch.

As for the interaction (wettability) between the aggregate coke powder and the binder pitch during the kneading step, the quantitative relation between them is identified by determining the surface electrostatic field intensity derived from the wet heat per nitrogen adsorbed per specific surface area of coke against an organic solvent and the dipole moment of the organic solvent. In concrete terms, the above-described interaction and the surface electrostatic field intensity have the relation given below.

When a solid specimen is wetted with a liquid, the interaction energy between a liquid molecule and the solid surface can be expressed as equation (1).

$$h_{1(SL)} - h_L = \Gamma(E_A - E_L) \quad (1)$$

where $h_{1(SL)}$ is the enthalpy change when the solid is wetted with the liquid, $h_L$ is the enthalpy change when a liquid molecule is adsorbed to the solid surface which has already adsorbed a single molecule layer of the liquid, $\Gamma$ is the number of molecules adsorbed per unit surface area, $E_A$ is the internal energy per adsorbed molecule, and $E_L$ is the internal energy per liquid molecule.

The right side terms $(E_A - E_L)$ of the equation (1) are described in equation (2).

$$E_A - E_L = E_1 + E_2 + E_3 \quad (2)$$

where $E_1$ is the London dispersion energy, $E_2$ is the interaction energy between the dipole of the liquid and the electrostatic field of the solid surface, and $E_3$ is the polarization energy of the adsorbed liquid molecule on the solid surface. The interaction energy $E_2$ between the dipole of the liquid and the electrostatic field of the solid surface is described in equation (3).

$$E_2 = -F \times \mu \quad (3)$$

where $F$ is the electrostatic field intensity on the solid surface, and $\mu$ is the dipole moment of the liquid.

Accordingly, when a liquid having the same value of $E_1$ *and $E_3$ and only differ in the value of $E_2$ is used to determine the wet enthalpy $h_{1(SL)}$, equation (1) is written as equation (4).

$$h_{1(SL)} - h_L = -\Gamma F \mu + \text{const.} \quad (4)$$

Consequently, when two types of organic solvent each having the same occupying area per molecule and having different dipole moments are used and when the wet enthalpy $h_{1(SL)}$ of the aggregate coke powder is determined using a twin conductive microcalorimeter, and when the values of the dipole moment $\mu$ and the value of $\{h_{1(SL)} - h_L\}$ are plotted to generate a line, the surface electrostatic field intensity $F$ of the coke powder is derived from the slope of the plotted line as an index of its wettability to pitch.

Addition of a surface active agent is a known practice for improving the interaction (wettability) between aggregate coke powder and pitch. However, coke which shows a low surface electrostatic field intensity inherently has many base planes, and strong bonding between coke and pitch at their interface cannot be expected during the carbonization stage. Another means of forcefully enhancing the coke surface electrostatic field intensity is the use of a wet oxidation using nitric acid or the like. This means, however, is not an industrial process, and the internal structure of coke itself has many base planes, so the contraction phenomenon appearing during the firing and carbonizing stage becomes less than that in the internal of carbonized zone in the pitch. Consequently, the difference in contraction causes crack development.

According to this invention, the aggregate component is fine mosaic coke particles containing large numbers of oxygen-containing functional groups and having a surface electrostatic field intensity of $1.2 \times 10^4$ esu/cm² or more. Therefore, a relatively small amount of pitch binder is able to cover uniformly the surface of the coke powder and to wet it sufficiently, and results in similar contraction to that of the pitch carbonized zone during the firing in the carbonizing stage. As a result, no cracks or defects occur in the material.

In addition, the aggregate coke powder of this invention is finely pulverized in a jet mill to an average particle size of 1 μm or less and a maximum particle size of 5 μm or less. Accordingly, the particle size is uniform, giving a large specific surface area for binding with pitch, and allowing high density packing at the molding stage. The resulting isotropic graphite shows an extremely high density and high strength.

Through the characteristic advantages induced by the use of aggregate coke powder described above, an efficient industrial production of high strength isotropic graphite having a bending strength of 120 MPa or more suitable for a piston component for gasoline engine can be realized without material defects being caused.

EMBODIMENT

The following is an example of this invention compared with other examples.

EXAMPLES 1 THROUGH 6

Fine mosaic pitch coke having a surface electrostatic field intensity of $1.2 \times 10^4$ esu/cm² or more was finely pulverized in a jet mill to specified sizes to prepare the aggregate components. A portion of each prepared aggregate component of 100 wt. parts was mixed with a specified amount of pitch binder between 100 and 120 wt. parts in a double-arm pressure kneader to blend them together at 200° C. under pressure. Then the mixture was kept at 250° C. to adjust the amount of volatile matter. The mixture was cooled and re-pulverized to an average particle size of 4 μm to obtain the raw material powder. Table 1 lists the properties of the aggregate coke powder used and the mixing rate of pitch.

Each of the prepared raw material powders was packed in a rubber casing, and the casing was set in a rubber press to mold the raw material into a block under a hydrostatic pressure of 1000 kg/cm². The mold was fired to carbonize it in a firing furnace at approximately 1000° C. in a non-oxidizing atmosphere. Then the carbonized mold was transferred into a graphitization furnace to carry out graphitization at a high temperature of 2800° C. Table 2 shows the characteristics of the prepared isotropic graphite and the material condition (appearance observation) after firing.

aggregate coke powder used and the mixing rate of pitch. The succeeding steps were kneading, molding, carbonizing and graphitizing conducted under the same conditions as Example 1 to obtain isotropic graphite. Table 2 shows the characteristics of the prepared isotropic graphite and the material condition (appearance observation) after firing.

TABLE 1

| Example/Comparative Example No. | Properties of aggregate coke powder | | | | Pitch mixing rate (wt. parts) |
|---|---|---|---|---|---|
| | True specific gravity (g/cm³) | Surface average electrostatic field intensity (× 10⁴ esu/cm²) | Average particle size (μm) | Maximum particle size (μm) | |
| Example 1 | 1.95 | 1.5 | 0.85 | 4.0 | 120 |
| Example 2 | 1.95 | 1.5 | 0.85 | 4.0 | 110 |
| Example 3 | 1.95 | 1.5 | 0.85 | 4.0 | 100 |
| Example 4 | 1.98 | 1.2 | 0.85 | 4.0 | 120 |
| Example 5 | 1.98 | 1.2 | 0.85 | 4.0 | 110 |
| Example 6 | 1.98 | 1.2 | 0.85 | 4.0 | 100 |
| Comparative Example 1 | 1.98 | 1.2 | 2.40 | 6.0 | 110 |
| Comparative Example 2 | 1.98 | 1.2 | 2.40 | 6.0 | 100 |
| Comparative Example 3 | 1.98 | 1.2 | 2.40 | 6.0 | 90 |
| Comparative Example 4 | 2.02 | 0.9 | 0.85 | 4.0 | 130 |
| Comparative Example 5 | 2.02 | 0.9 | 0.85 | 4.0 | 120 |
| Comparative Example 6 | 2.02 | 0.9 | 0.85 | 4.0 | 110 |
| Comparative Example 7 | 2.06 | 0.7 | 0.86 | 5.0 | 140 |
| Comparative Example 8 | 2.06 | 0.7 | 0.86 | 5.0 | 130 |
| Comparative Example 9 | 2.06 | 0.7 | 0.86 | 5.0 | 120 |

COMPARATIVE EXAMPLE 1 THROUGH 3

Fine mosaic pitch coke having a surface electrostatic field intensity of $1.2 \times 10^4$ esu/cm² or more was finely pulverized in a jet mill to specified sizes to prepare the aggregate components. A portion of each prepared aggregate component of 100 wt. parts was mixed with a specified amount of pitch binder between 90 to 110 wt. parts in a double-arm pressure kneader to blend them together at 200° C. under pressure. Then the mixture was kept at 250° C. to adjust the amount of volatile matter. The mixture was cooled, and re-pulverized to an average particle size of 4 μm to obtain the raw material powder. Table 1 lists the properties of the aggregate coke powder used and the mixing rate of pitch.

Each of the prepared raw material powders was subjected to kneading, molding, and carbonizing and graphitizing treatment under the same conditions as Example 1 to prepare graphite. Table 2 shows the characteristics of the prepared isotropic graphite and the material condition (appearance observation) after firing.

COMPARATIVE EXAMPLE 4 THROUGH 9

Pitch coke having a surface electrostatic field intensity of less than $1.0 \times 10^4$ esu/cm² was finely pulverized in a jet mill to specified sizes to prepare the aggregate components. A portion of each prepared aggregate component of 100 wt. parts was mixed with a specified amount of pitch binder between 110 to 120 wt. parts. Table 1 lists the properties of characteristics of the prepared isotropic graphite and the material condition (appearance observation) after firing.

TABLE 2

| Example/Comparative Example No. | Bulk specific gravity (g/cm³) | Bending strength (MPa) | Modulus of elasticity (GPa) | Condition after firing (external appearance) |
|---|---|---|---|---|
| Example 1 | 1.91 | 145 | 16.5 | Good condition without cracks |
| Example 2 | 1.90 | 139 | 16.2 | Good condition without cracks |
| Example 3 | 1.90 | 130 | 16.1 | Good condition without cracks |
| Example 1 | 1.91 | 137 | 1.60 | Good condition without cracks |
| Example 2 | 1.90 | 133 | 1.60 | Good condition without cracks |
| Example 3 | 1.89 | 122 | 15.8 | Good condition without cracks |
| Comparative Example 1 | 1.85 | 100 | 14.5 | Good condition without cracks |
| Comparative Example 2 | 1.83 | 98 | 14.2 | Good condition without cracks |
| Comparative Example 3 | 1.83 | 97 | 14.1 | Good condition without cracks |
| Comparative Example 4 | — | — | — | Material defective |
| Comparative Example 5 | 1.89 | 112 | 15.2 | Good condition without cracks |
| Comparative Example 6 | 1.88 | 105 | 14.9 | Good condition without cracks |
| Comparative Example 7 | — | — | — | Material defective |
| Comparative Example 8 | — | — | — | Material defective |
| Comparative | 1.88 | 89 | 13.9 | Good condition |

TABLE 2-continued

| Example/ Comparative Example No. | Bulk specific gravity (g/cm³) | Bending strength (MPa) | Modulus of elasticity (GPa) | Condition after firing (external appearance) |
| --- | --- | --- | --- | --- |
| Example 9 | | | | without cracks |

As shown in Table 1 and Table 2, the isotropic graphite prepared in Examples 1 to 6 had superior strength characteristics giving a bulk specific gravity of 1.89 g/cm³ or more and a bending strength of 120 MPa or more, and showed an excellent material structure after firing, with no defective phenomena such as cracks. On the other hand, Comparative Examples 1 to 3 used a fine mosaic coke having a surface average electrostatic field intensity of $1.2 \times 10^4$ esu/cm² as the aggregate component, but they gave a bending strength below 120 MPa because the particle properties were outside the specified range of this invention. Since Comparative Examples 4 to 9 used an ordinary coke powder which had lower surface average electrostatic field intensity than the range specified in this invention, the material characteristics were degraded. In particular, owing to the fine particle size, Comparative Examples 4, 7, and 8 which incorporated a large amount of pitch resulted in the breaking of the material during the firing stage and failed to provide products.

As described above in detail, according to the invention, a fine mosaic coke is prepared by finely pulverizing in a jet mill to an average particle size of 1 µm or less and a maximum particle size of 105 µm or less and having a surface average electrostatic field intensity of $1.2 \times 10^4$ esu/cm² as the aggregate component, and the manufacturing method employs kneading, molding, and carbonizing and graphitizing steps similar to those used in the conventional process. These selected aggregate and manufacturing processes allow the manufacture of a high strength isotropic graphite on an industrial scale. Since the obtained high strength isotropic graphite has a bending strength of 120 MPa or more, the products of this invention hold promise as graphite piston components for gasoline engines.

What is claimed is:

1. A method for manufacturing a high strength isotropic graphite molded product comprising the steps of: kneading an aggregate consisting of carbonaceous fine powder with a pitch binder to form a kneaded mixture, said carbonaceous fine powder being a fine mosaic coke powder having an average particle size of 1 µm or less, a maximum particle size of 5 µm or less and a surface average electrostatic field intensity of at least $1.2 \times 10^{-4}$ esu/cm²; pulverizing the kneaded mixture to form a raw material; molding the raw material under isostatic pressure to prepare a molded article; and carbonizing and graphitizing the molded article by heat treatment in a non-oxidizing atmosphere to produce the high-strength isotropic graphite molded product.

2. The method of claim 1, wherein the pitch binder is mixed at a ratio of 100–120 parts by weight to 100 parts by weight aggregate.

3. The method of claim 1, wherein the kneading is conducted under a positive pressure and at a temperature of 150°–250° C. and the kneaded mixture is pulverized to an average particle size of 3–5 µm.

* * * * *